(12) United States Patent
Lee et al.

(10) Patent No.: US 8,522,224 B2
(45) Date of Patent: Aug. 27, 2013

(54) METHOD OF ANALYZING INTRINSIC PARALLELISM OF ALGORITHM

(75) Inventors: Gwo-Giun Lee, Taipei (TW); He-Yuan Lin, Kaohsiung (TW)

(73) Assignee: National Cheng Kung University, Tainan (TW)

( * ) Notice: Subject to any disclaimer, the term of this patent is extended or adjusted under 35 U.S.C. 154(b) by 577 days.

(21) Appl. No.: 12/820,602

(22) Filed: Jun. 22, 2010

(65) Prior Publication Data

US 2011/0314441 A1  Dec. 22, 2011

(51) Int. Cl.
*G06F 9/45* (2006.01)

(52) U.S. Cl.
USPC .......................................................... 717/149

(58) Field of Classification Search
USPC .......................................................... 717/149
See application file for complete search history.

(56) References Cited

U.S. PATENT DOCUMENTS

| | | | | |
|---|---|---|---|---|
| 5,587,922 | A * | 12/1996 | Hendrickson et al. | 716/124 |
| 7,724,256 | B2 * | 5/2010 | Grady et al. | 345/440 |
| 2002/0092005 | A1 | 7/2002 | Scales | |
| 2006/0136468 | A1 | 6/2006 | Robison | |
| 2009/0292511 | A1 | 11/2009 | Vrancic et al. | |

OTHER PUBLICATIONS

Ernie W. Chan "Application of Dependence Analysis and Runtime Data Flow Graph Scheduling to Matrix Computations", Dissertation, [online], The University of Texas at Austin, Doctor of Philosophy, Aug. 2010 [Retrieved on Sep. 30, 2011], pp. i-xi, 1-159, Retrieved from the Internet: <URL: http://userweb.cs.utexas.edu/-echan/vpapers/dissertation.pdf>.
Escuder et al., "Quantifying ILP by means of Graph Theory," Proceeding of the $2^{nd}$ international conference on performance evaluation methodologies and tools, Oct. 23-25, 2007, Nantes, France.
Janneck et al., "Profiling Dataflow Programs, Proceedings of IEEE ICME," Jun. 2008, pp. 1065-0168.
Amdahl, Gene, "Validity of the single processor approach to achieving large scale computing capabilities," Proc. of AFIPS Conference, 1967, pp. 483-485.
Prihozhy et al., "Evaluation of the Parallelization Potential for Efficient Multimedia Implementations: Dynamic Evaluation of Algorithm Criticial Path,"IEEE Transactions on Circuits and Systems for Video Technology, May 2005, pp. 593-608, vol. 15—No. 5.

* cited by examiner

*Primary Examiner* — Wei Zhen
*Assistant Examiner* — Lanny Ung
(74) *Attorney, Agent, or Firm* — Muncy, Geissler, Olds & Lowe, PLLC

(57) ABSTRACT

A method of analyzing intrinsic parallelism of an algorithm, comprising: generating a dataflow graph which is composed of vertexes representing computation and directed edges denoting the dependency and flow of data from the algorithm; building a matrix representing the dataflow graph; and quantifying the intrinsic parallelism based on rank and dimension of the matrix representing the generated dataflow graph.

7 Claims, 3 Drawing Sheets

Algorithm $$O_1 = A_1 + B_1 + C_1 + D_1$$
$$O_2 = A_2 + B_2 + C_2$$
$$O_3 = A_3 + B_3 + C_3$$

Dataflow Model

Dataflow Graph

Rank theorem

Parallelism

2×     1×

(Heterogeneous)

METHOD OF ANALYZING INTRINSIC PARALLELISM OF ALGORITHM

BACKGROUND OF THE INVENTION

1. Field of Invention

The invention relates to a method of analyzing and quantifying intrinsic parallelism of an algorithm.

2. Related Art

Amdahl's law (G. M. Amdahl, "Validity of single-processor approach to achieving large-scale computing capability," Proc. of AFIPS Conference, pp. 483-485, 1967) introduced a theoretical maximum speedup of parallelization of a software program. The theoretical maximum speedup is determined by the ratio of sequential part within the program, since the sequential part cannot be paralleled due to the high data dependencies. Amdahl's law provided a brief and initial high level idea for characterizing parallelisms. However, the parallelism measured by this technique depends rather on the target platforms but not on the algorithms themselves. Therefore, such a parallelism measurement is extrinsic to the algorithms and is biased by the target platforms.

In a similar manner, the graph-based technique (V. Escuder, R. Duran, R. Rico, "Quantifying ILP by means of graph theory," Proceedings of the 2nd international conference on performance evaluation methodologies and tools, 2007) quantifies the instruction level parallelism (ILP) of programs based on the graph theory. This technique initially represents a sequence of instructions by data dependence matrix, D. Subsequently, the critical path length of the program is determined by the matrix multiplication of D. This technique is more specific for processor-oriented platforms. Hence, the quantifications of ILP are not intrinsic to algorithms but depend on the targeted platforms and compiler used.

Prihozhy et al defined the parallelization potential based on the ratio between the computational complexity and the critical path length of algorithms also capable of estimating the degree of parallelism (A. Prihozhy, M. Mattavelli and D. Mlynek, "Evaluation of the parallelization potential for efficient multimedia implementations: dynamic evaluation of algorithm critical path," IEEE Trans. on Circuits and Systems for Video Technology, pp. 593-608, Vol. 15, No. 5, May 2005). They measured the complexity by means of the total number of operations. The critical path length is then defined as the largest number of operations that have to be sequentially performed. As compared to Amdahl's law and the ILP method, the parallelization potential based on the number of operations reveals more intrinsic parallelism measurements but of course at a lower data granularity. However, this method can not reveal the most intrinsic parallelism of algorithms, since the number of operations and critical path length are calculated based on data flow execution graphs (DFEG) generated by C/C++ programs, which could be biased by programming styles and data structures.

On the other hand, the causation trace graphs generated by dataflow models of algorithms can reveal more intrinsic dependency of algorithms and hence algorithmic parallelism. In general, the relatively thin and linear part of a causation trace graph is composed of more sequential operations and the wider part contains higher degree of parallelism. In the paper (J. W. Janneck, D. Miller and D. B. Parlour, "Profiling dataflow programs," Proceeding of IEEE ICME 2008, pp. 1065-1068, June 2008), the parallelizability of the computation can then be measured to reveal the work done on average at the same time. However, this method is incapable of quantifying the exact degree of parallelism.

SUMMARY OF THE INVENTION

In view of the foregoing, an object of the invention is to provide a method of analyzing intrinsic parallelism of an algorithm.

Algorithm/architecture co-exploration (AAC) methodology that can concurrently explore both algorithms and architectures based on intrinsic algorithmic complexity extraction and analysis is becoming a design paradigm in the emerging electronic system level (ESL) design era. Intrinsic parallelism of algorithm is one of the most important complexity metrics that can facilitate the exploration of the emerging platforms comprising application specific integrated circuits (ASIC), reconfigurable circuits, massive parallel processing elements (PE), and multicore embedded CPU for the ever more complicated algorithms adopted in modern and future signal and information processing applications. Hence, exploiting parallelisms embedded within the algorithms thereby becomes necessary and essential to concurrently optimizing both algorithms and architectures. The objective of the present invention is to provide a systemic method based on linear algebraic theories to quantify the upper bound of degree of intrinsic parallelism embedded within algorithms so as to facilitate the development of signal and information processing systems on emerging platforms. In other words, the extracted parallelisms are intrinsic to algorithms themselves and hence unbiased for either hardware or software and thereby are capable of assisting in the algorithm/architecture co-exploration for the signal and information processing systems.

To achieve the above, a method of analyzing intrinsic parallelism of an algorithm according to invention comprises: generating a dataflow graph which is composed of vertexes representing computation and directed edges denoting the dependency and flow of data from the algorithm; building a matrix representing the dataflow graph; and quantifying the intrinsic parallelism based on rank and dimension of the matrix representing the generated dataflow graph.

As mentioned above, the present invention discloses the algorithmic complexity measuring method on intrinsic parallelisms for the novel algorithm/architecture co-design methodology capable of concurrently exploring both algorithms and architectures and hence optimizing systems. Algorithmic complexity analysis and dataflow modeling play significant roles in the concurrent optimization of both algorithms and architectures. For advanced and future signal and information processing, the intrinsic parallelism is undoubtedly one of the most important complexity metrics. Based on dataflow modeling of algorithms and mapping the dataflow graphs onto linear equations with Dependency and/or Laplacian matrixes, for example, the present invention is capable of systematically quantifying intrinsic parallelisms embedded in algorithms by charactering the degree of freedom of the linear equation system. Besides, in the invention, the rank theorem is used to speed up the quantification of the intrinsic parallelism. Furthermore, the intrinsic parallelism extracted can effectively facilitate the design space exploration of new emerging platforms composed of application specific integrated circuits (ASIC), reconfigurable circuits, massive parallel processing elements (PE), and multicore embedded CPU for ever more complicated signal and information processing applications.

Compared with the prior arts, the method of the invention has several advantages. First of all, it provides a theoretically robust method in quantifying the parallelism of algorithms whereas the causation trace (illustrated by J. W. Janneck, D. Miller and D. B. Parlour) provided only comparative information for the potentials of parallelisms. Besides, benefiting from dataflow modeling, the method of the invention is also applicable for characterizing algorithms with irregular data dependencies. In addition, as compared to the analysis based on the high level programming model and the quantification of ILP, the parallelism metric of the invention is intrinsic and hence will not be specific only to processor oriented platforms and is capable of mapping algorithms onto generic platforms and even those for distributed systems.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

One of the versatile parallelisms embedded within algorithms can be revealed as the independent operation sets that are independent of each other and hence can be executed in parallel without synchronization. However, the independent operation sets are composed of dependent operations that must be sequentially performed. Hence, in a strict manner, the degree of parallelism embedded in an algorithm is equal to the number of the fully independent operation sets. The main goal of the method of the invention is to extract such an intrinsic parallelism from the analysis of the generated dataflow graphs based on dataflow modeling and linear algebra. The input is the algorithm to be analyzed, and the outputs include the upper bound of degree of intrinsic parallelism and the associated independent operation sets that can be executed in parallel without synchronization.

Figure 1:
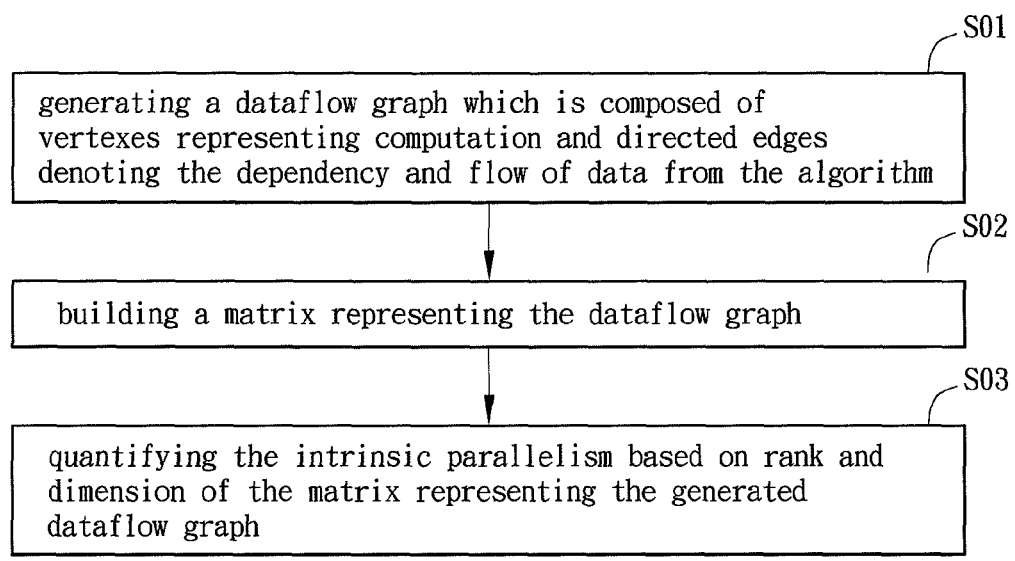
FIG. 1 is a flow chart of a method of analyzing parallelism of an algorithm according to a preferred embodiment of the invention.
Figure 2:
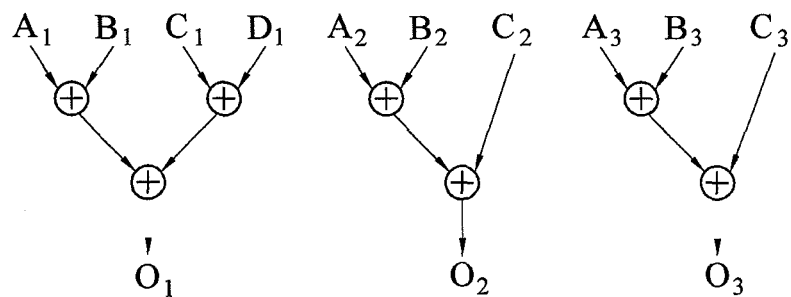
FIG. 2 is a schematic diagram of a case illustrating the method of analyzing parallelism of an algorithm.
Figure 2:
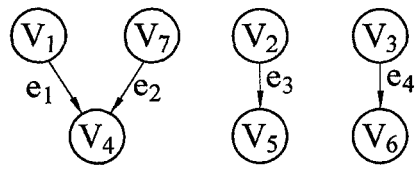
Figure 2:
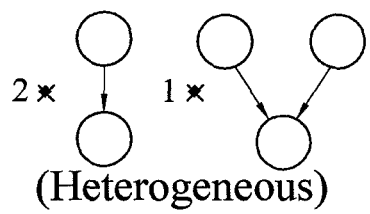

FIG. 1 is a flow chart of a method of analyzing parallelism of an algorithm according to a preferred embodiment of the invention, and FIG. 2 is a schematic diagram of a case illustrating the method of analyzing parallelism of an algorithm. As shown in FIGS. 1 and 2, the step S01 is generating a dataflow graph which is composed of vertexes $v_1$ to $v_7$ representing computation and directed edges $e_1$ to $e_4$ denoting the dependency and flow of data from the algorithm. The algorithm as shown in FIG. 2 is instanced here as a simple case for clear illustration, but not for limitations on purpose. In the embodiment, the dataflow graph is generated from a dataflow model representing the algorithm. The dataflow model can not only describe the behaviors or functionalities of the algorithm but also reveal its architectural characteristics.

Vertexes $v_1$ to $v_7$ represent computation and directed edges $e_1$ to $e_4$ denote the dependency and flow of data from the algorithm. For example, the vertex $v_1$ represents the computation of variables $A_1$ and $B_1$, and the edge $e_1$ from $v_1$ to $v_4$ denotes the dependency and flow of data regarding the vertexes $v_1$ and $v_4$, and the rest can be deduced by analogy.

The step S02 is building a matrix that represents the dataflow graph. The matrix can be a Laplacian matrix or a Dependency matrix, for example. The Laplacian matrix has the form as below:

$$L(i, j) = \begin{cases} \text{degree}(v_i) & \text{if } i = j, \\ -1 & \text{if } v_i \text{ and } v_j \text{ are adjacent,} \\ 0 & \text{others.} \end{cases}$$

where degree($v_i$) is the number of edges connected to the i-th vertex $v_i$. The Dependency matrix has the form as below:

$$M(i, j) = \begin{cases} 1, & \text{if } v_j \text{ is the tail of } e_i \\ -1 & \text{if } v_j \text{ is the head of } e_i, \\ 0 & \text{otherwise.} \end{cases}$$

where $v_j$ denotes j-th vertex, and $e_i$ denotes i-th edge. The matrix as shown in FIG. 2 is a Laplacian matrix for illustration. The matrix, whether the Laplacian matrix or the Dependency matrix, can be built by the above forms; besides, the matrix also can be built from a plurality of linear equations onto which the dataflow graph is mapped (this part will be described hereinafter).

The step S03 is quantifying the intrinsic parallelism based on the rank and dimension of the matrix representing the generated dataflow graph. Based on the rank theorem, it can be derived that the degree of parallelism is equal to the number of variables minus the rank of the matrix. Besides, the rank of a matrix can be easily calculated according to the conventional ways, such as a reduced echelon matrix. In the case as shown in FIG. 2, the number of the variables of the Laplacian matrix is equal to 7, and the rank of the matrix is 4, so the degree of parallelism is equal to 3.

In addition, the method of analyzing parallelism of an algorithm can further comprise the step of identifying independent operation sets based on the basis spanning the null space of the matrix representing the generated dataflow graph.

What follows is the further description of the invention.

Dataflow Model Representing Algorithm

In signal processing applications, the intrinsic parallelisms are capable of being characterized by causation graphs generated from dataflow models. This is due to the fact that the dataflow models inheriting from mathematical expression can explicitly depict the interrelationships and data transfers between operations or computations without constraints from design parameters. Hence, they can clearly reveal the data dependencies between each operation via vertices and directed edges, where the vertices denote the operations (computations) and the directed edges represent the sources and destinations of the data, i.e. the flow of data. In addition, dataflow models can naturally represent the concurrency or parallelism in algorithms due to the featuring data-driven property. Therefore, as compared with traditional high level programming models, dataflow models not only contain the more intrinsic complexity characteristics of algorithms but also reveal the architectural information for implementations. Undoubtedly, in the algorithm/architecture co-exploration, the dataflow model act as a bridge between algorithms and architectures, which are originally two isolated stages of design in traditional methodologies. Consequently, the parallelism analysis system of the invention employs the dataflow models to represent the algorithms.

Mapping Dataflow Graphs onto Linear Equations

Given a dataflow graph G of an algorithm composed of n vertexes that represent operations and m edges that denote data dependency and flow of data, in which the vertex set of G is V(G)={$v_1, v_2, \ldots, v_n$} and the edge set of G is E(G)={$e_1$, $e_2, \ldots, e_m\}$. By assigning each operation $v_i$ of the dataflow graph G with a variable $x_i$, the invention can transform the data dependency between each operation by linear equations, namely dependency constraints. If the operation $v_i$ depends on the operation $v_j$, such a data dependency constraint can be expressed by the following equation:

$$x_i - x_j = 0 \quad (1)$$

Consequently, the dataflow graph having n operations (or n vertexes) and m data dependency (or directed edges) can be transformed into a linear equation system possessing n variables and m equations. This results in an m-by-n dependency matrix M such that Mx=0.

$$M(i, j) = \begin{cases} 1, & \text{if } v_j \text{ is the tail of } e_i \\ -1 & \text{if } v_j \text{ is the head of } e_i \\ 0 & \text{otherwise.} \end{cases} \quad (2)$$

Clearly, the invented Dependency matrix can be seen as a transposed form of the traditional incidence matrix in the graph theory in which the rows and columns are corresponding to edges and vertexes, respectively. Subsequently, we would like to consider the higher-order form of the linear equation that represents a dataflow graph so as to reveal more characteristics of dataflow graphs. Now, let's study the quadratic form of the original linear equation:

$$(Mx)^t(Mx) = x^t M^t M x \quad (3)$$

It is easy to find that the quadratic form of the dependency matrix, $M^tM$ is equivalent to the n-by-n Laplacian matrix L in the spectral graph theory:

$$L(i, j) = \begin{cases} \text{degree}(v_i) & \text{if } i = j, \\ -1 & \text{if } v_i \text{ and } v_j \text{ are adjecent,} \\ 0 & \text{others.} \end{cases} \quad (4)$$

where degree($v_i$) is the number of edges connected to the i-th vertex $v_i$. In the Laplacian matrix, the i-th diagonal element shows the number of operations that are connected to the i-th operation and the off-diagonal element denotes whether two operations are connected. By substituting (4) into (3), the value of $x^T L x$ can be shown to be the sum of square difference between the adjacent vertexes:

$$x^t L x = \sum_{(v_i, v_j) \in E(G)} (x_i - x_j)^2, \quad (5)$$

where $(v_i, v_j) \in E(G)$ represents all the operation pairs $(v_i, v_j)$ whose $v_i$ and $v_j$ are adjacent to each other. The Laplacian matrix L provides an alternative way to represent dataflow graphs.

So far, the Dependency matrix M and the Laplacian matrix L have been introduced to represent the dataflow graph in a very compact manner. What follows is explanation of how to extract the independent operation sets of algorithm and hence intrinsic parallelisms based on the Dependency matrix or the Laplacian matrix.

Method Based on Dependency Matrix

In order to extract the number of independent operation sets of an algorithm and hence reveal the intrinsic degree of parallelism, this invented technique proposes to identify the connected components in the dataflow graph by solving the linear equation representing the dataflow graph. Eventually, the independent operation sets can be easily identified by the basis spanning the null space of M. Besides, the number of connected components is equal to the dimension of the null space of the dependency matrix, which is also equal to number of operations minus the rank of the dependency matrix:

$$\begin{aligned} DoP &= \text{number of indepentent operation sets} \quad (6) \\ &= \text{number of variables} - \text{rank } M \\ &= \text{dim Null } M, \end{aligned}$$

where DoP stands for the upper bound on degree of parallelism, dim Null M is the dimension of the null space of M, representing the number of free variables in Mx=0, and rank M is the row rank of M, indicating the number of the linearly independent equations. The reasons and simple proof is shown in the following paragraphs:

If two operations or vertexes, $v_i$ and $v_j$, are not directly connected but can be linked through other vertexes, their associated variables will be definitely equal, i.e. $x_i = x_j$. Consequently, the values of variables associated with the vertexes in a same connected component shall be the identical. In other words, a connected component results in one degree of freedom or free variable for the linear equation system representing the algorithm. In addition, each linearly independent basis of the null space of M is corresponding to a connected component. Hence, the number of connected components (degree of parallelism), of course, equals the degree of freedom of the linear equation system. Furthermore, based on the rank theorem:

If a matrix $A$ has $n$ columns, then rank $A$+dim Nul $A=n$, $\quad$ (7)

It is easy to conclude that the degree of freedom (degree of parallelism) is also equal to the number of variables minus the rank of the dependency matrix, which is the effective degree of constraint due to data dependency.

In summary, this invention initially represents an algorithm by a dataflow model and generates the dataflow graph containing data dependency information. Subsequently, in order to reveal the degree of parallelism, this invention again transforms the dataflow graph into a linear equation system. Eventually, this invention proves that the degree of parallelism is equivalent to the degree of freedom of the linear equation system.

Table I summarizes the physical definitions of each terminology in the dataflow graph and the linear dependency equation system that represent an algorithm. In general, the maximum degree of parallelism embedded within an algorithm without any data dependency constraints is equal to the number of operations of the algorithms. However, if an algorithm consists of higher data dependency, its degree of parallelism is correspondingly degraded. Consequently, the degree of parallelism is a complement to the degree of data dependency. In the method of the invention, the effective degree of data dependency can be quantified via the rank of the dependency matrix. On the contrary, the degree of parallelism can be quantified via the dimension null space of the dependency matrix. Based on the rank theorem (7), it is easy to verify that the quantified degree of parallelism and degree of dependency are complement to each other, which also prove the correctness of this invention.

TABLE I

Summary of physical definitions

| Causation trace graph | Linear equation system |
| --- | --- |
| Vertexes represent operations | Variables represent operations |
| Directed edges represent data dependency | Linear equation represent data dependency |
| # of operations is the maximum degree of parallelism without any data dependency | # of variables is the maximum degree of parallelism without any data dependency |
| Connected components represent the independent operation sets | Basis spanning the null space represents the independent operation sets |
| # of connected components is the degree of strict-sense parallelism | Dimension of the null space is the degree of strict-sense parallelism |
| | Rank of the linear system represents the effective degree of data dependency constraint |

Method Based on Laplacian Matrix

Based on the following well-known properties of the spectral graph theory: (1.) the smallest Laplacian eigenvalue of a connected graph equals 0 and the corresponding eigenvector= $[1, 1, \ldots, 1]^T$, (2.) there exists exact one eigenvalue=0 of Laplacian matrix of a connected graph and (3.) the number of connected components in the graph equals the number of eigenvalue=0 of the Laplacian matrix, it is obvious that the degree of the strict-sense parallelism embedded within the algorithm is equal to the number of the eigenvalue=0 of the Laplacian matrix of the dataflow graph. Besides, based on the spectral graph theory, the independent operation sets can be identified according to the eigenvectors associated with the eigenvalues=0. Furthermore, by comparing the eigenvalues and eigenvectors of each independent operation set, one can know whether the parallelism is homogeneous or heterogeneous.

Consequently, it is easy to obtain the degree of parallelism of algorithms by calculating the number eigenvalue=0 of the Laplacian matrix based on the rank theorem (7):

$$DoP = \text{number of indepentent operation sets} \quad (8)$$
$$= \text{number of } \lambda = 0 \text{ of } L$$
$$= \dim L - \text{rank } L$$
$$= \dim \text{Null } L,$$

where □ is the eigenvalue of the Laplacian matrix and dim L is the dimension of the Laplacian matrix, which is equal to the number of operations or vertexes. Since the Laplacian matrix is the quadratic form of the dependency matrix, their dimension of null space is always equivalent. This again shows that either method can reveal the intrinsic parallelism of algorithms.

Selection Between the Two Methods for Charactering Intrinsic Parallelisms

Given a dataflow graph G composed of n vertexes and m edges, the dimensions of the associated dependency matrix and Laplacian matrix are m-by-n and n-by-n, respectively. Consequently, the method of invention can adaptively select the one possessing lower complexity in transforming the original matrixes into echelon forms:

$$\begin{cases} \text{Dependency matrix is choosed, if } n \geq m. \\ \text{Laplacian matrix is choosed, otherwise.} \end{cases} \quad (9)$$

If the number of operations (vertex) is larger than the number of dependencies (directed edges), the dependency matrix is employed, and otherwise Laplacian matrix is preferable.

Figure 3:
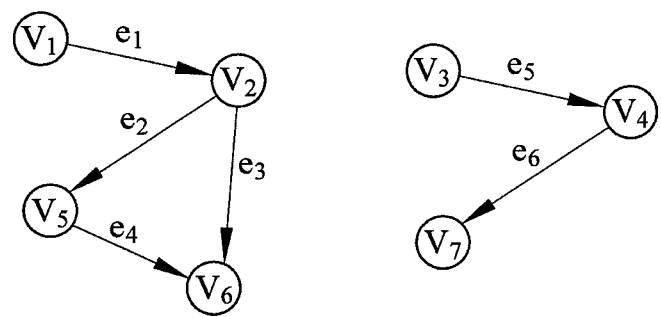
FIG. 3 is a schematic diagram of a dataflow graph of an embodiment.

FIG. 3 schematically shows an example of a dataflow graph to illustrate the method of analyzing intrinsic parallelism in the algorithm represented by the dataflow graph.

A.) Based on Dependency Matrix

According to FIG. 1, the six data dependencies result in the following five equations:

$$x_1-x_2=0$$
$$x_2-x_5=0$$
$$x_2-x_6=0$$
$$x_5-x_6=0$$
$$x_3-x_4=0$$
$$x_4-x_7=0 \quad (10)$$

Consequently, the dependency matrix and the associated linear equation system are shown as the following:

$$\begin{bmatrix} 1 & -1 & 0 & 0 & 0 & 0 & 0 \\ 0 & 1 & 0 & 0 & -1 & 0 & 0 \\ 0 & 1 & 0 & 0 & 0 & -1 & 0 \\ 0 & 0 & 0 & 0 & 1 & -1 & 0 \\ 0 & 0 & 1 & -1 & 0 & 0 & 0 \\ 0 & 0 & 0 & 1 & 0 & 0 & -1 \end{bmatrix} \begin{bmatrix} x_1 \\ x_2 \\ x_3 \\ x_4 \\ x_5 \\ x_6 \\ x_7 \end{bmatrix} = \begin{bmatrix} 0 \\ 0 \\ 0 \\ 0 \\ 0 \\ 0 \end{bmatrix} \quad (11)$$

Its corresponding reduced echelon matrix is $$\begin{bmatrix} 1 & 0 & 0 & 0 & 0 & -1 & 0 \\ 0 & 1 & 0 & 0 & 0 & -1 & 0 \\ 0 & 0 & 1 & 0 & 0 & 0 & -1 \\ 0 & 0 & 0 & 0 & 0 & 0 & -1 \\ 0 & 0 & 0 & 0 & 0 & -1 & 0 \\ 0 & 0 & 0 & 0 & 0 & 0 & 0 \end{bmatrix} \quad (12)$$

Eventually, the null space of the dependency matrix is:

$$\text{span}\left\{ \begin{bmatrix} 1 \\ 1 \\ 0 \\ 0 \\ 1 \\ 1 \\ 0 \end{bmatrix}, \begin{bmatrix} 0 \\ 0 \\ 1 \\ 1 \\ 0 \\ 0 \\ 1 \end{bmatrix} \right\} \quad (13)$$

Clearly, based on (12), we can find that the rank of the dependency matrix is only five, although the dataflow graph originally contains six data depended constraints. In other words, the effective degree of dependency constraint is only five. In addition, based on (13), the dimension of the null space of dependency matrix is 2 and the basis is $\{[1\ 1\ 0\ 0\ 1\ 1\ 0]^t,$ and $[0\ 0\ 1\ 1\ 0\ 0\ 1]^t\}$. Consequently, the degree of strict-sense parallelism is 2. Furthermore, according to the basis spans the null space of the dependence graph, we can find that the first, second, fifth and sixth vertexes are connected, since they share a same value. Thus, they form an independent operation set. One the other hand, the rest of vertexes form another independent operation set. This case illustrates a representative example to reveal the effectiveness of the invented method of quantifying intrinsic of parallelism.

B.) Based on Laplacian Matrix

The Laplacian matrix of the dataflow graph shown in FIG. 3 is $$\begin{bmatrix} -1 & -1 & 0 & 0 & 0 & 0 & 0 \\ -1 & 3 & 0 & 0 & -1 & -1 & 0 \\ 0 & 0 & 1 & -1 & 0 & 0 & 0 \\ 0 & 0 & -1 & 2 & 0 & 0 & -1 \\ 0 & -1 & 0 & 0 & 2 & -1 & 0 \\ 0 & -1 & 0 & 0 & -1 & 2 & 0 \\ 0 & 0 & 0 & -1 & 0 & 0 & 1 \end{bmatrix} \quad (14)$$

Its corresponding reduced echelon matrix is $$\begin{bmatrix} 1 & 0 & 0 & 0 & 0 & -1 & 0 \\ 0 & 1 & 0 & 0 & 0 & -1 & 0 \\ 0 & 0 & 1 & 0 & 0 & 0 & -1 \\ 0 & 0 & 0 & 1 & 0 & 0 & -1 \\ 0 & 0 & 0 & 0 & 1 & -1 & 0 \\ 0 & 0 & 0 & 0 & 0 & 0 & 0 \\ 0 & 0 & 0 & 0 & 0 & 0 & 0 \end{bmatrix} \quad (15)$$

Eventually, the eigenspace corresponding to $\square=0$ of the Laplacian matrix is:

$$\mathrm{span}\left\{\begin{bmatrix} 1 \\ 1 \\ 0 \\ 0 \\ 1 \\ 1 \\ 0 \end{bmatrix}, \begin{bmatrix} 0 \\ 0 \\ 1 \\ 1 \\ 0 \\ 0 \\ 1 \end{bmatrix}\right\} \quad (16)$$

Clearly, based on (15), we can find that the rank of the Laplacian matrix is only five. In addition, based on (16), the dimension of the null space of Laplacian matrix is 2 and the basis is $\{[1\ 1\ 0\ 0\ 1\ 1\ 0]^t,$ and $[0\ 0\ 1\ 1\ 0\ 0\ 1]^t\}$. Consequently, the degree of strict-sense parallelism is 2. Furthermore, according to the eigenvectors corresponding $\square=0$ of the Laplacian graph, we can find that the first, second, fifth and sixth vertexes are connected, since they share a same value. Thus, they form an independent operation set. One the other hand, the rest of vertexes form another independent operation set. Clearly, the two methods based on the Dependency matrix and the Laplacian matrix result in the same outcomes.

In summary, the present invention discloses the algorithmic complexity measuring method on intrinsic parallelisms for the novel algorithm/architecture co-design methodology capable of concurrently exploring both algorithms and architectures and hence optimizing systems. Algorithmic complexity analysis and dataflow modeling play significant roles in the concurrent optimization of both algorithms and architectures. For advanced and future signal and information processing, the intrinsic parallelism is undoubtedly one of the most important complexity metrics. Based on dataflow modeling of algorithms and mapping the dataflow graphs onto linear equations with Dependency and/or Laplacian matrixes for example, the present invention is capable of systematically quantifying intrinsic parallelisms embedded in algorithms by charactering the degree of freedom of the linear equation system. Besides, in the invention, the rank theorem is used to speed up the quantification of the intrinsic parallelism. Furthermore, the intrinsic parallelism extracted can effectively facilitate the design space exploration of new emerging platforms composed of application specific integrated circuits (ASIC), reconfigurable circuits, massive parallel processing elements (PE), and multicore embedded CPU for ever more complicated signal and information processing applications.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of analyzing intrinsic parallelism of an algorithm, comprising:

generating a dataflow graph which is composed of vertexes representing computation and directed edges denoting the dependency and flow of data from the algorithm;

building a matrix representing the dataflow graph;

quantifying the intrinsic parallelism based on rank and dimension of the matrix representing the dataflow trace graph; and wherein a degree of the intrinsic parallelism is equal to a number of vertexes minus a rank of the matrix.

2. The method of analyzing intrinsic parallelism of an algorithm as recited in claim 1, wherein the dataflow graph is generated from a dataflow model representing the algorithm.

3. The method of analyzing intrinsic parallelism of an algorithm as recited in claim 1, wherein the matrix is built from a plurality of linear equations onto which the dataflow graph is mapped.

4. The method of analyzing intrinsic parallelism of an algorithm as recited in claim 1, wherein the matrix is a Dependency matrix, which has the form as below:

$$M(i,j) = \begin{cases} 1, & \text{if } v_j \text{ is the tail of } e_i \\ -1 & \text{if } v_j \text{ is the head of } e_i \\ 0 & \text{otherwise.} \end{cases}$$

where $v_j$ denotes j-th vertex, and $e_i$ denotes i-th edge.

5. The method of analyzing intrinsic parallelism of an algorithm as recited in claim 1, wherein the matrix is a Laplacian matrix, which has the form as below:

$$L(i, j) = \begin{cases} \text{degree}(v_i) & \text{if } i = j, \\ -1 & \text{if } v_i \text{ and } v_j \text{ are adjecent}, \\ 0 & \text{others}. \end{cases}$$

where degree($v_i$) is the number of edges connected to the i-th vertex $v_i$.

6. The method of analyzing intrinsic parallelism of an algorithm as recited in claim 1, further comprising:
   identifying independent operation sets based on a basis spanning a null space of the matrix representing the generated dataflow graph.

7. The method of analyzing intrinsic parallelism of an algorithm as recited in claim 1, wherein if a number of the vertexes is not smaller than that of the edges, the matrix is a Dependency matrix, and otherwise the matrix is a Laplacian matrix.

* * * * *